W. L. HENDRICKS.
HARVESTING MACHINE.
APPLICATION FILED SEPT. 29, 1913.

1,177,104.

Patented Mar. 28, 1916.
7 SHEETS—SHEET 7.

UNITED STATES PATENT OFFICE.

WALTER L. HENDRICKS, OF AURORA, ILLINOIS.

HARVESTING-MACHINE.

1,177,104.

Specification of Letters Patent.

Patented Mar. 28, 1916.

Application filed September 29, 1913. Serial No. 792,301.

*To all whom it may concern:*

Be it known that I, WALTER L. HENDRICKS, a citizen of the United States, and resident of Aurora, county of Kane, and State of Illinois, have invented certain new and useful Improvements in Harvesting-Machines, of which the following is a specification, and which are illustrated in the accompanying drawings, forming a part thereof.

The invention relates to harvesting machines, and more particularly to those having provision for reaping grain and tying it into bundles.

In the harvesting machines of this class which are now in common use the power for driving the operative parts of the machine is usually derived from a single traction wheel known as the "bull wheel." In order that this wheel may serve to transmit the required amount of power, it is located centrally beneath the operative parts for receiving the greater part of the weight of the entire machine. This substantial balancing of the machine upon a single traction wheel has numerous disadvantages, among which are the lashing of the draft pole from side to side and a lateral shifting movement of the machine upon encountering obstructions in the ground over which it is drawn. The location of the single traction wheel directly beneath the operative parts of the machine also makes it necessary to support these parts in an elevated position, with the result that the grain must be carried up to them for being tied into bundles and the bundles then lowered for being discharged upon the ground.

The present invention has for its object to provide a harvesting machine of the type described, which shall be of such improved construction as to permit of its being drawn smoothly along the ground while still supplying sufficient tractive power for driving its operative parts, and to permit all of the operative parts of the machine to be located near the ground.

The invention accordingly contemplates an improved form of harvesting machine in which the traction wheels and operative parts are located upon different transverse lines.

In the accompanying drawings.

The machine preferably comprises the usual sickle bar 25 and inwardly-moving endless apron 26. These and other parts of the machine are principally associated about a horizontal open frame comprising the front and rear transverse rails 46, 47, and the longitudinal side and intermediate rails 29, 30, 36 and 48. The longitudinal rail 29 is located beyond the outer end of the apron 26. This side of the frame is supported by the usual grain wheel 28. At its inner end the apron 26 extends over a driving roll 57. This roll is journaled at its opposite ends in the front and rear transverse rails 46 and 47.

Figure 9:
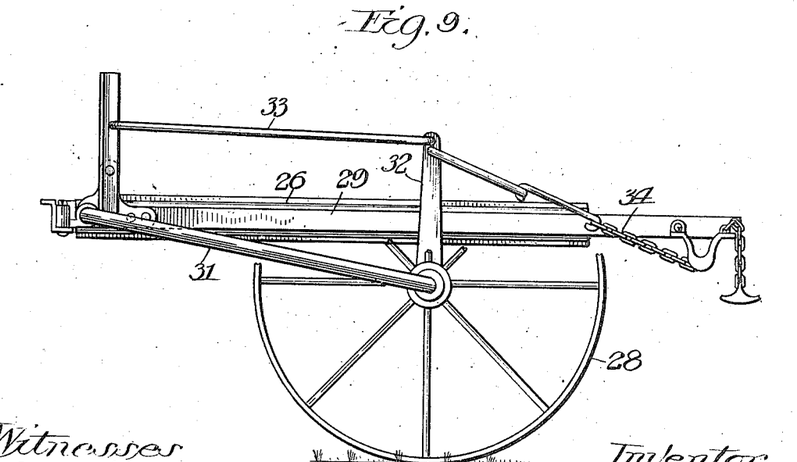
Fig. 9 is a detail side elevation of the machine showing the parts adjacent to one of the carrying wheels.

The construction provides for changing the elevation of the sickle bar 25, both by raising and lowering the frame and by adjusting the pitch or inclination of the frame. For raising and lowering the frame at one side a well known form of vertical adjustment is provided for the grain wheel 28. This mechanism is illustrated in Fig. 9. It comprises a bracket arm 31, having one end pivotally secured to the side rail 29 adjacent the forward edge of the frame, and having the grain wheel 28 journaled upon its other end.

An adjustable truss serves for swinging the bracket 31 to raise and lower the grain wheel. This truss comprises the usual strut 32, link 33 and chain 34. A pair of longitudinally disposed rigid frame members 35 and 36ª extend over the first-mentioned frame. These frame members have downwardly curved rear end portions, as 37, 38, which connect with the rear transverse rail 47. The frame members 35 and 36ª are each firmly connected at their forward ends with the front transverse rail 46, as by uprights 27. Cross ties 39 serve for connecting the two frame members 35, 36ª, at suitable intervals. An upwardly inclined stub tongue 40 is pivotally attached to the front transverse rail 46, as at 41, and extends forwardly therefrom. A power truck, as the one generally designated 42, serves for supporting the stub tongue 40. A rear carrying wheel, as 43, is also provided.

The mechanism for tying the grain into bundles may take any convenient form of construction, and will preferably include an inclined table 44, through which the needle, as 45, and packers 201 operate in the usual manner. As shown, the table 44 extends laterally upward from the inner end of the apron 26, and projects beyond the frame for the delivery of the bundles of grain at that side of the machine which is remote from the apron. A series of picker fingers 200, located over the lower edge of the table 44 and operated by a shaft 68, serve for moving the grain upwardly along the table 44 for engagement by the packers 201.

A main drive shaft is shown at 49. A countershaft is shown at 50, and the shaft for operating the packers 201 appears at 51. The main drive shaft is preferably transversely arranged in the machine adjacent the rear end of the same, and is journaled at its opposite ends in the intermediate rail 36 and in the side rail 48. The countershaft 50 is shown as extending in the direction of the length of the machine, and is journaled at its opposite ends in the front and rear transverse rails 46, 47. The countershaft 50 is operatively connected to the drive shaft 49 at all times, as by means of the beveled gears shown at 52, 53.

The countershaft 50 preferably has a sprocket wheel 54 fixed upon its rear end, and a crank disk 55 fixed upon its forward end. A pitman 56 operatively connects the crank disk 55 with the sickle bar 25. The sprocket wheel 54 serves for transmitting power to all of the other operative parts of the machine. As shown, a sprocket chain 58 turns over the sprocket wheel 54 and over sprocket wheels 59 and 60 mounted upon the rear ends of the packer shaft 51 and roll 57, respectively. All of the operative parts of the bundle-tying mechanism may receive power through the packer shaft 51 in any well known manner.

As shown, the knotter shaft, shown at 61, is operatively connected with the packer shaft 51 by an upright shaft 62, and the needle shaft, as 63, is operatively connected with the knotter shaft 61 by a link 64. A beveled gear 65, mounted upon the forward end of the roll 57, serves for transmitting power to the reel, as 66, through an intermediate mechanism (not shown). A spur gear 67 is also mounted on the forward end of the roll 57. A second intermediate mechanism (not shown) serves for transmitting power from this spur gear to the picker shaft 68.

The front truck, as the one generally designated 42, is preferably so constructed as to serve both for transmitting power to the drive shaft 49 and for guiding the machine. This form of front truck is illustrated in detail in Fig. 6. As there shown it comprises a pair of traction wheels 69, 70, and an upright bolster frame 71. The stub tongue 40 conveniently extends through and is suspended from the bolster frame 71. As shown, the stub tongue and bolster are connected by staples 72 and 73, which are hooked together and one of which is secured in the stub tongue 40 and the other of which is secured in the bolster frame 71.

Figure 6:
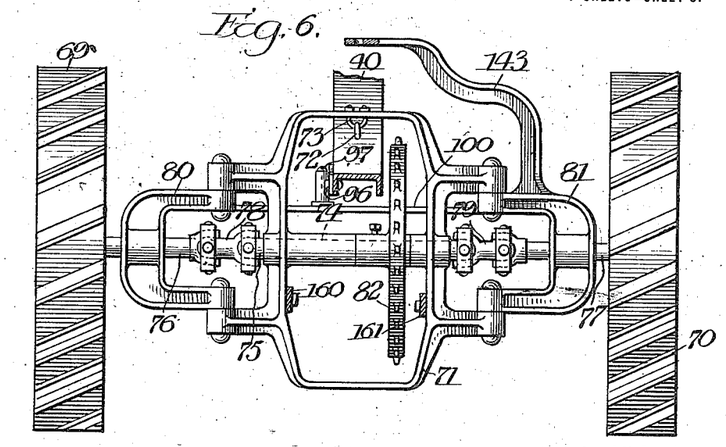
Fig. 6 is a rear elevation of one form of front truck which may be used upon the machine, a detail of the stub tongue and of a steering rod being shown in section.

When the operative parts of the machine are to receive power from the movement of the traction wheels, as 69 and 70, over the ground, these wheels are preferably fixed upon the ends of the axle, as 74, for rotation therewith in one direction. To permit the swinging of the traction wheels 69 and 70 for guiding the machine, the axle 74 is preferably made sectional and comprises an intermediate section 75 which extends centrally through and is journaled in the bolster frame 71, and outer sections 76 and 77 each connected to the corresponding end of the intermediate section 75 by a universal joint, as 78, 79. The outer sections 76, 77, of the axle each extend from the adjacent end of the intermediate section 75 to the corresponding one of the traction wheels 69 and 70.

A swinging bracket, as 80 and 81, is hingedly connected to the bolster frame 71 at each end for supporting the corresponding outer section 76, 77, of the axle 74. To prevent binding of the parts when these brackets are swung upon their pivots, the outer sections 76 and 77 of the axle are preferably slidingly journaled in these brackets. A driving sprocket 82 is fixed upon the intermediate section 75 of the axle 74. This sprocket wheel is operatively connected with the driving shaft 49 by a sprocket chain 83. Preferably the sprocket chain 83 turns over a sprocket wheel 84, which is normally loosely mounted on the drive shaft 49 and is arranged to be rotatably connected therewith by a clutch 85. As shown, the adjacent faces of the clutch 85 and sprocket wheel 84 have complementary formed clutch teeth 86, 87. A spring 88 serves for moving the clutch 85 into engagement with the sprocket wheel 84. This spring is coiled about the drive shaft 49 and reacts between the clutch 85 and a shoulder, as 89, formed upon the shaft.

Any convenient means may be employed for moving the clutch 85 out of engagement with the sprocket wheel 84 against the effort of the spring 88. As shown, a bell crank 90 is pivotally secured upon an adjacent part of the frame of the machine, as the transverse rail 47, and has one arm bearing against an annular shoulder 91 formed on the clutch 85. The other arm of the bell crank 90 is provided with a socket 92 for receiving the crank 93 of an upright crank shaft 94. The crank shaft 94 is shown as being journaled at its lower end upon the transverse rail 47. It extends upwardly from this journal beyond the bell crank lever 90 to a conveniently accessible position.

When a team is to be used for drawing the machine a pole, as 95, is preferably provided. The inner end of this pole is shown as being pivotally secured to the stub tongue 40. To this end a bracket 96 is secured against the stub tongue 40 just in front of its point of connection with the bolster frame 71, and a king bolt 97 extends vertically through the bracket 96 and through the pole 95. In order that the pole 95 may serve for swinging the traction wheels 69 and 70, a bracket arm 98, 99, is desirably formed integral with each of the brackets 80 and 81, and extends forwardly therefrom. A link 100 extends between and connects the outer ends of the bracket arms 98 and 99. This link extends beneath and is pivotally connected to the pole, as by a bolt 101. A draft appliance, as the evener 102, is preferably provided. This evener is desirably applied to the forward end of the stub tongue 40. As shown, a clevis 103 is mounted upon the forward end of the stub tongue for connection with the evener.

For adjusting the pitch or inclination of the platform 26 a threaded strut 104 extends obliquely between the stub tongue 40 and the frame of the machine. The lower end of the threaded strut 104 is shown as being provided with a projecting stud or gudgeon 105. This gudgeon normally enters a socketed plate 106, carried by the stub tongue. As shown the socketed plate 106 is pivotally attached to the stub tongue 40 to swing in a vertical plane. A nut 107, having threaded engagement with the strut 104, serves for connecting the strut with the frame. This nut is desirably pivotally secured to the forward end of the frame member 36ª.

Any convenient means may be employed for rotating the strut 104 to change the angle of inclination of the stub tongue 40 with respect to the frame, and thereby afford one method of adjusting the elevation of the sickle bar 25. As shown, a shaft 108 is operatively connected to the higher end of the strut 104 by a knuckle joint, as 111, and extends rearwardly therefrom. A hand wheel 110 is mounted on the rear end of the shaft, and a driver's seat 109 is conveniently located adjacent this hand wheel. As shown, the driver's seat rises from and is supported by the frame member 35.

If desired a post 112, which rises from the main frame member 36ª adjacent the driver's seat 109, may be provided for supporting the rear end of the shaft 108. As shown, the shaft 108 is slidingly journaled in a collar 113 carried by the post 112. To permit the necessary tilting of the shaft 108 incident to the longitudinal movement of the threaded strut 104, the collar 113 is pivotally mounted in the higher end of the post 112.

The rear carrying wheel 43 may be attached to the frame in any convenient manner, but provision will preferably be made for raising and lowering this wheel, for permitting the wheel to swing when a short turn is to be made with the machine in one direction, and for turning the wheel to a different position when the machine is to be transported from place to place. As shown, a bracket, generally designated 114, is secured against the downwardly curved rear end portion of the frame member 36ª for supporting the wheel 43. This bracket conveniently comprises upper and lower horizontal frame members 115 and 116, and an upright post 117 extending between and connecting the horizontal frame members 115 and 116 intermediate their ends. If desired a toothed quadrant 118 may be formed upon the post 117 at one side of the bracket. A vertical spindle 119 extends through and is slidingly journaled in the horizontal frame members 115, 116, of the bracket 114 adjacent their rear ends. A stub axle 120 is secured to the spindle 119 adjacent its lower end, and receives the wheel 43.

The elevation at which the rear end of the main frame is supported by the carrying wheel 43 is adjusted by sliding the spindle 119 up or down. For this purpose a hand lever 121 is conveniently provided. As shown, the hand lever 121 is pivotally secured against the frame of the quadrant 118 at 122, and carries a pawl 123 which plays over the toothed margin of the quadrant. A link 124 extends between the hand lever 121 and the higher end of the spindle 119. In order that the spindle 119 may rotate when in any position of vertical adjustment, the higher end of the link 124 is secured to a collar 125 which rotatably receives the spindle. This collar is fixed against longitudinal movement on the spindle 119 by being located between a collar 126, which is fixed upon the end of the shaft, as by a set screw 127, and the hub 128 of a crank arm 129 which is also fixed to the shaft. As the hub 128 of the crank arm 129 serves for receiving the weight of the rear end portion of the machine and transferring it to the spindle 119, it is desirably secured to the spindle by means of a pin 130.

During the forward movement of the machine and during the turning of the same to the right, the rear carrying wheel 43 is preferably held in alinement with the frame. On the other hand, provision is preferably made for permitting the rear carrying wheel 43 to swing to an angular position when the machine is turned toward the left in order that a short turn may be made toward the grain side of the machine. As shown, a link 131 is connected to the outer end of the crank arm 129 and extends forwardly therefrom. A yoke 132 is formed upon the forward end of the link 131. This yoke serves for pivotally connecting the link to a stud 133. This stud is in turn slidingly connected with a horizontally swinging crank arm 136. For this purpose the stud is provided with a gib 134, which runs in a slideway 135 formed in the crank arm. The crank arm 136 is connected by a pivot bolt 137 to a fixed part of the frame, as by an extension 138 of one of the cross ties 39. Most desirably the crank arm 136 is formed with an overturned end portion, as 141, and the pivot bolt 137 passes vertically through this part of the crank arm. In the normal position of the parts the stud 133 is in vertical alinement with the pivot bolt 137, and the swinging of the crank arm 136 has no effect upon the angular position of the crank arm 129 or carrying wheel 43.

For swinging the crank arm 136, a link 142 extends between this crank arm and a crank arm 143 mounted upon one of the swinging brackets, as 81, of the front truck 42. When the wheels, as 69, 70, of the front truck 42 are turned to the right, the link 142 is drawn forward. This moves the crank arm 136 to a position in which that end of the slideway 135 which is remote from the line of the pivot bolt 137 is obliquely in front of that end of the slideway which is normally occupied by the gib 134. Movement of the gib in the slideway is thereby prevented and the arm 129 is locked against rearward movement. The rear carrying wheel 43 is thus held in alinement with the frame. When the wheels, as 69, 70, of the front truck 42 are swung to the left, the crank arm 136 is moved to a position in which that end of the slideway 135 which is remote from the line of the pivot bolt 137 is in rear of the pivot. In this position of the parts the engagement of the rear carrying wheel 43 with the ground will serve to swing this wheel outward, as the machine is advanced toward the left, the gib 134 sliding obliquely backward in the slideway 135 and permitting the swinging of the crank arm 129 to a position in which the carrying wheel 43 occupies an oblique position. The rear end of the machine will thus be guided toward the right, as the front truck 42 is drawn toward the left, and a short turn of the machine toward the left may be made. When the wheels 69, 70, of the front truck 42 are returned to positions in alinement with the frame, the link 142 will be drawn forward to an intermediate position. This returns the rear carrying wheel 43 to a position in alinement with the frame. As the raising and lowering of the spindle 119 will have a slight effect in varying the distance between the outer end of the crank arm 129 and stud 133, the link 131 is desirably provided with a turn buckle 144 for adjusting its length to maintain the crank arm 129 and rear carrying wheel 43 in correct position for forward movement of the machine in a straight line at that position of vertical adjustment of the spindle 119 which will be most commonly used.

Provision is preferably made for drawing the machine in the direction of the length of the sickle bar 25, when the machine is to be transported from place to place. One way in which this may be accomplished is by transferring the front truck 42 to a position beyond the end of the apron 26, and by swinging the rear carrying wheel 43 to the position indicated by dotted lines in Fig. 2. When this is to be done the carrying wheel 28 is desirably raised to an inoperative position, and a supplemental carrying wheel 145 is applied to the machine in a symmetrical position with reference to the front truck 42 and rear carrying wheel 43.

Figure 11:
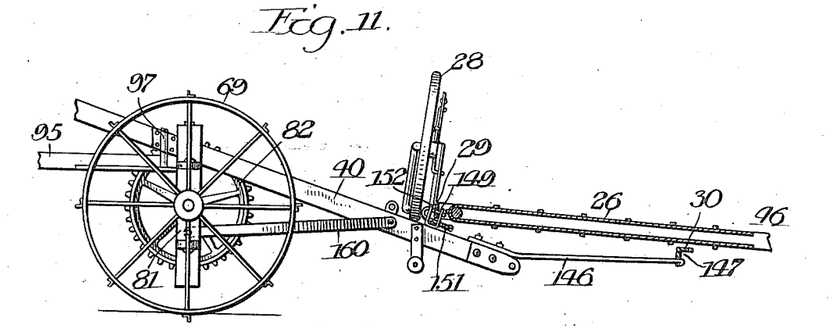
Fig. 11 is a detail rear elevation showing a position which may be adopted for the front truck when the machine is to be transported from place to place.
Figure 12:
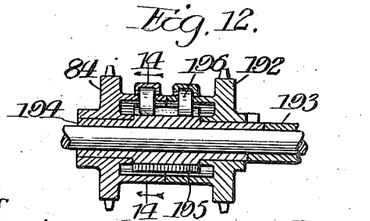
Fig. 12 is a detail sectional view taken on the line 12—12 of Fig. 10.

The location of the front truck 42 beyond the end of the apron 26 is shown in Fig. 11. For transferring the front truck to this position, the stub tongue 40 is detached from the frame at 41, and a brace rod 146 is secured to the stub tongue to form a rearward extension of the same. The stub tongue 40 is then passed beneath the outer end of the apron 26, and the rear end of the brace rod 146 is inserted in a socket 147 provided in one of the intermediate rails, as 30, of the frame. A latch 149, mounted on the stub tongue 40 adjacent its rear end, serves for connecting the stub tongue with the adjacent side rail, as 29, of the frame. As shown, the latch 149 includes a spring bolt 151, and an aperture 152 is formed in the side rail 29 for receiving the bolt.

Figure 1:
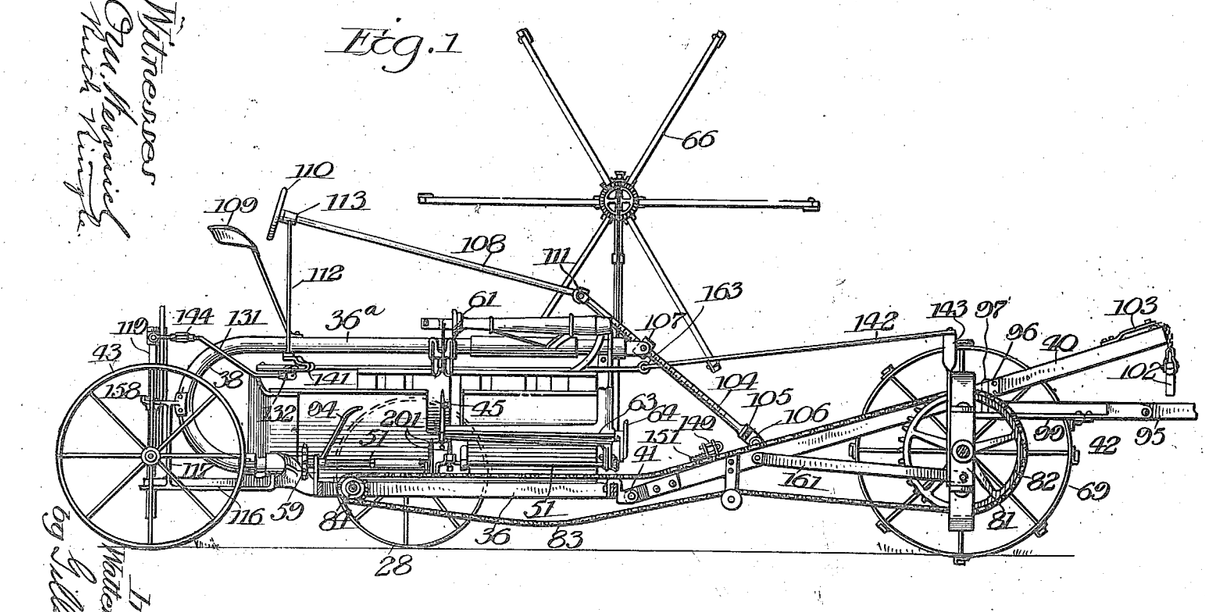
Figure 1 is a side elevation of a form of harvesting machine embodying the features of improvement provided by the invention, some of the parts being removed and others being shown in section.
Figure 2:
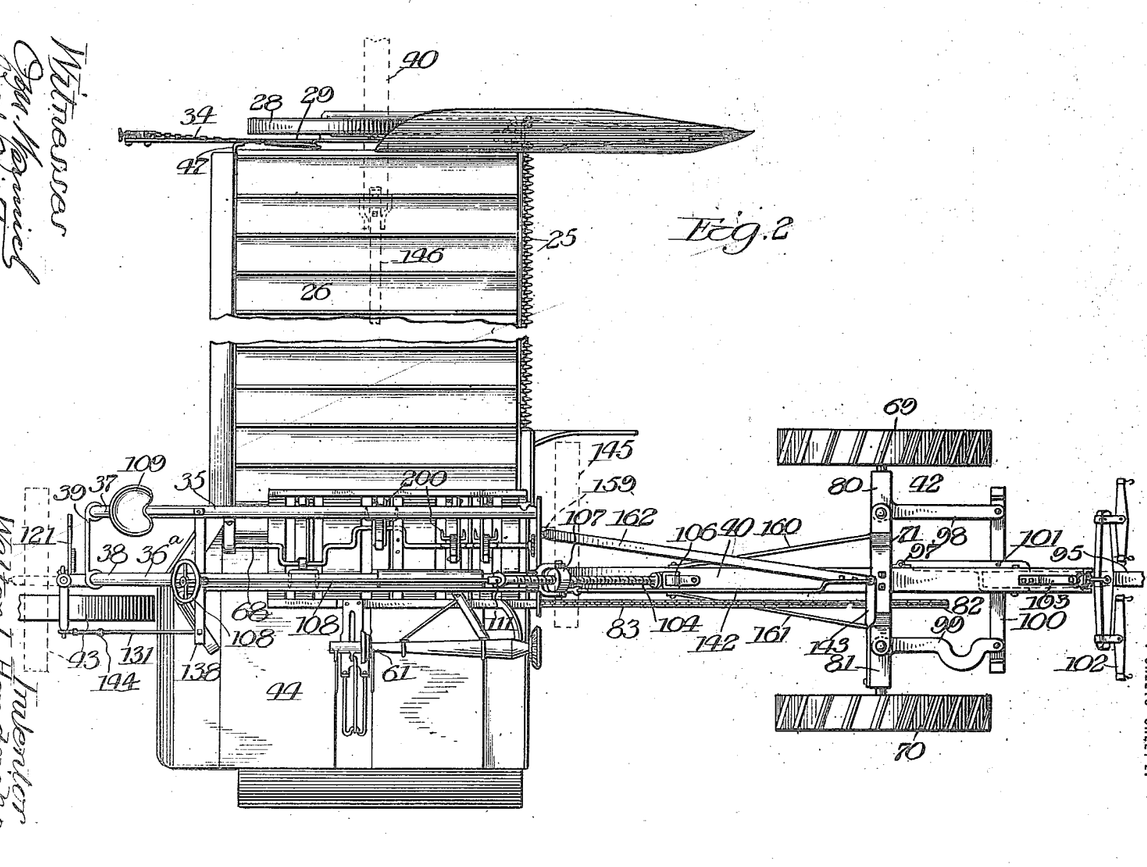
Fig. 2 is a plan view of the harvesting machine illustrated in Fig. 1, a different position of certain of the parts being indicated by dotted lines.
Figure 3:
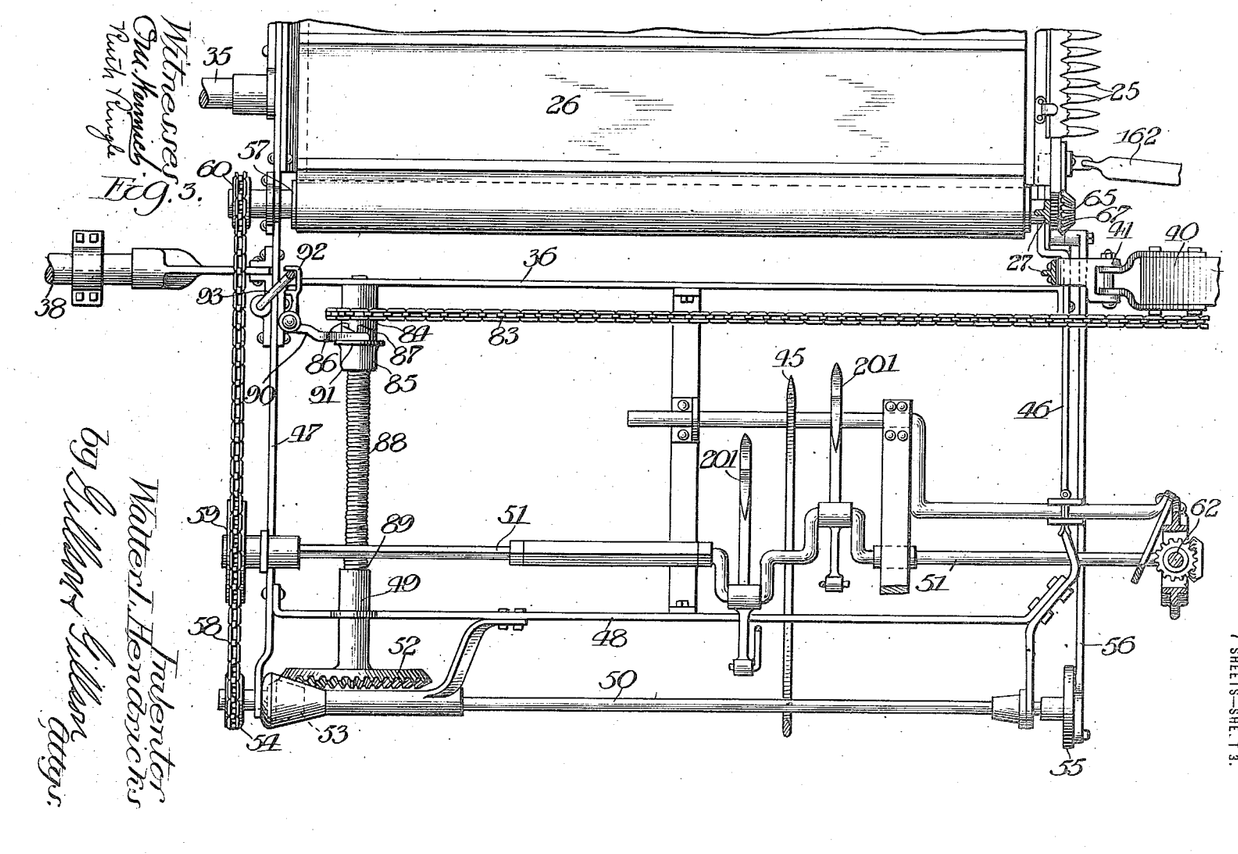
Fig. 3 is a detail plan view of the machine showing the parts located beneath the bundle table, the supports for said table and certain other upright parts of the machine being shown in section.
Figures 4, 5, 13, 14:
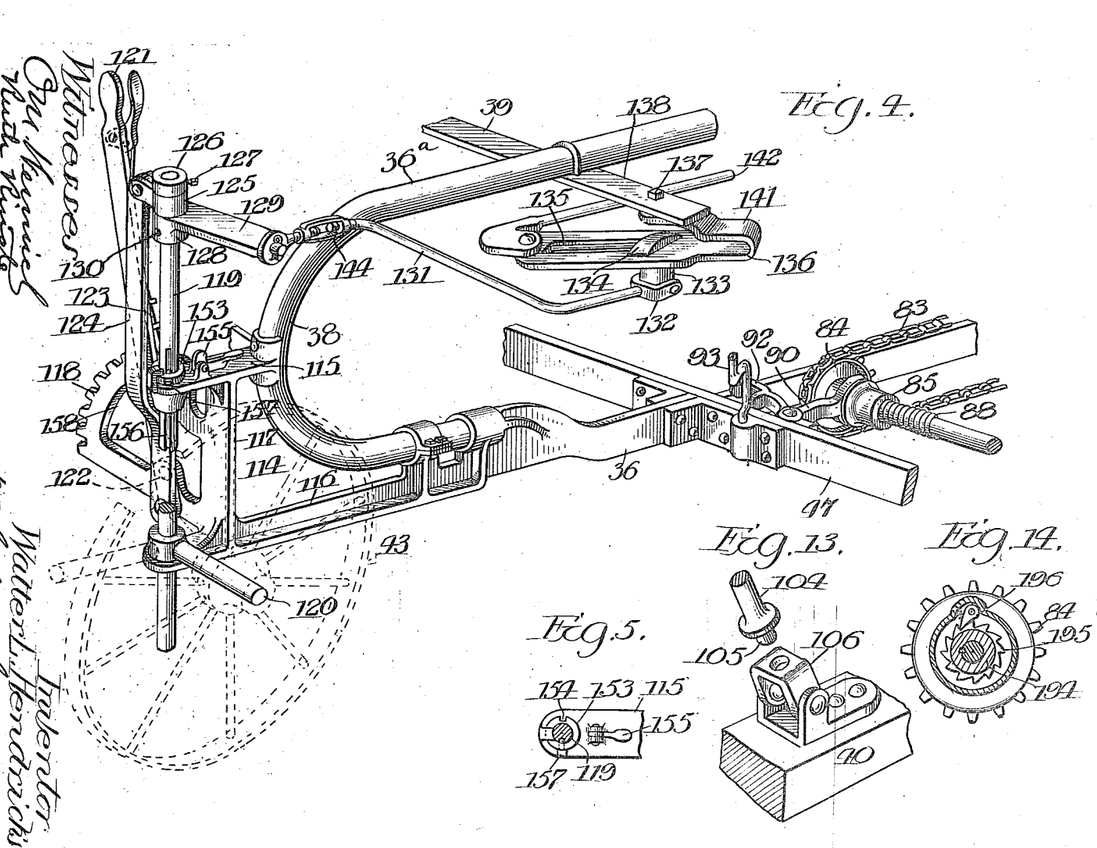
Fig. 4 is a detail perspective view of the machine, showing the parts adjacent a rear supporting wheel.
Fig. 5 is a detail plan sectional view showing a form of latch used for securing the rear supporting wheel in a position which it may assume when the machine is to be transported from place to place.
Fig. 13 is a detail perspective view.
Fig. 14 is a detail sectional view taken on the line 14—14 of Fig. 12.

For turning the rear carrying wheel 43 to the position indicated by dotted lines in Fig. 2, the link 131 is disconnected from the crank arm 129 and the spindle 119 is given a one quarter turn to the left, as viewed in Fig. 4. Any convenient means may be employed for securing the spindle 119 against turning when in this position. As shown, a collar 153 is slidingly mounted upon the spindle 119 but is fixed against rotation thereon. The rim of this collar is provided with a notch 154 (Fig. 5) for receiving a latch 155. As shown, the latch 155 is pivotally mounted upon the upper horizontal frame member 115 of the bracket 114. When the parts of the machine are in operative position, this latch is desirably turned to the inactive position illustrated in Fig. 4. The collar 153 is fixed against rotation on the spindle 119 by forming a key-way 156 in the spindle and by providing the collar 153 with a set screw 157 for entering said key-way. If desired the collar 153 may be held against vertical movement, as by means of an overhanging lug 158 formed upon the upper horizontal frame member 115 of the bracket 114 and projecting over the collar.

For securing the supplemental carrying wheel 145 to the frame of the machine, a stub axle 159 may be permanently secured to a part of the frame at that end remote from the rear carrying wheel 43, as by mounting it upon the front transverse rail 46. When the machine is to be transported from place to place, the supplemental carrying wheel 145 is temporarily mounted upon this stub axle. Usually the front truck 42 will include brace rods, as 160, 161, extending between the bolster frame 71 and stub tongue 40 for maintaining the bolster frame in an upright position. Similarly when the front truck 42 is located in the position indicated by full lines in Fig. 2, a brace rod 162 preferably extends obliquely between the stub tongue 40 and a part of the frame, as the front transverse rail 46. When the front truck 42 is to be transferred to the position illustrated in Fig. 11, the brace rod 162 may be removed.

It will be observed that if the supplemental carrying wheel 145 is applied to the stub axle 159 before the stub tongue 40 has been detached, that part of the weight of the machine which is normally supported by the front truck 42 may be transferred to the supplemental carrying wheel 145 by turning back the threaded strut 104. A continued turning of the threaded strut 104 after the supplemental carrying wheel 145 has come into engagement with the ground will cause the gudgeon 105 upon the end of the threaded strut 104 to be withdrawn from engagement with the socketed bracket 106, as appears in Fig. 13. It will also be understood that before the front truck 42 can be transferred from the position illustrated by the full lines in Fig. 2 to the position illustrated in Fig. 11, the link 142 must be detached and the drive chain 83 removed. To facilitate detaching the link 142, this link is desirably joined as indicated at 163.

In some instances it may be desirable to use a front truck, as 164 (Figs. 7 and 8) having a continuous axle 165. In event such a truck is to be used a stub tongue 166 is preferably substituted for the stub tongue 40. The truck 164 has traction wheels 167, 168, mounted upon the opposite ends of the axle 165 for rotation therewith in one direction. This form of truck also includes a rigid bolster 169. The axle 165 is journaled in this bolster, as at 170 and 171. In this instance an upright shaft 172 serves as a king bolt for pivotally connecting the stub tongue 166 and bolster 169. This shaft preferably extends centrally through the bolster and stub tongue, and has beveled gears, as 173 and 174, mounted upon its opposite ends. The beveled gear 173 operatively engages a beveled gear 175 fixed upon the axle 165. The beveled gear 174 operatively engages a beveled gear 176. This last-mentioned beveled gear is desirably mounted upon one end of a short shaft 177. The shaft 177 is shown as being journaled in a bracket arm 178 carried by the stub tongue 166. A sprocket wheel 179, mounted on the shaft 177, serves to receive the drive chain 83 in lieu of the sprocket wheel shown at 82 in Fig. 6.

Figure 7:
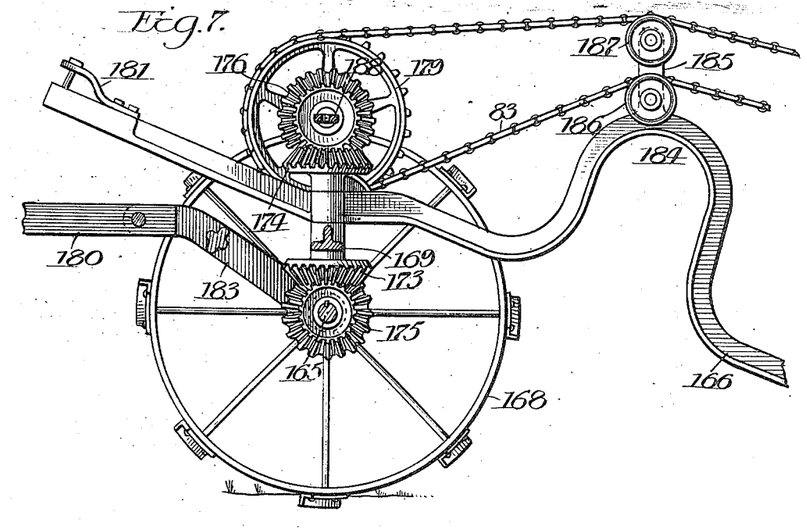
Fig. 7 is a detail central longitudinal sectional view of a machine embodying a different form of front truck from that illustrated in Fig. 6.
Figure 8:
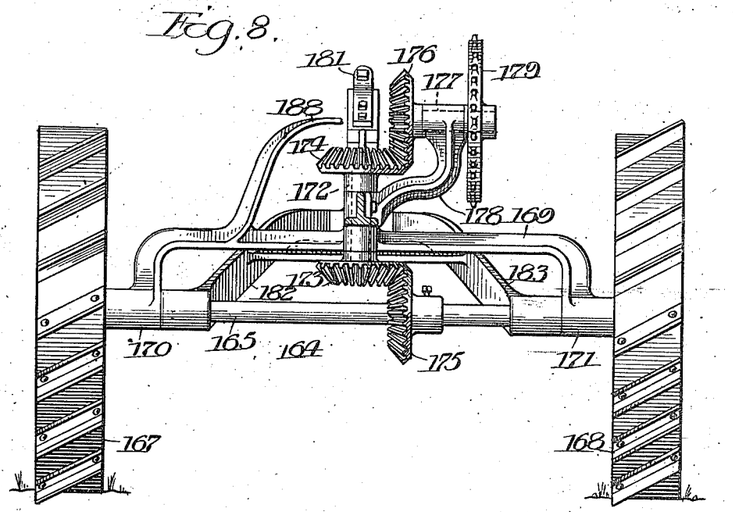
Fig. 8 is similar to Fig. 6, but shows the form of front truck illustrated in Fig. 7.

When a front truck of the form shown at 164 is employed, it may be supplied with a pole, as 180, and the outer end of the stub tongue 166 will be supplied with a clevis 181 for the connection of a hitch therewith. The pole 180 is shown as being pivotally connected with the axle 165, as by being provided with a pair of diverging bracket arms 182, 183, at its rear end through which the axle is extended. The movement of the traction wheels 167 and 168 over the ground will serve for transmitting power to the operative parts of the machine through the driving chain 83, in any angular position of the truck. Most desirably the stub tongue 166 is deflected upwardly, as indicated at 184, intermediate its ends to clear the corresponding traction wheel 167 or 168 when the truck is turned to an oblique position in either direction. Usually the elevated part 184 of the stub tongue 166 will be supplied with a bracket 185, and guide pulleys 186 and 187, for guidedly engaging the two turns of the sprocket chain 83, are rotatably mounted upon this bracket. If desired, the bolster 169 may be supplied with a crank arm 188 for connection with the forward end of the link 142.

Figure 10:
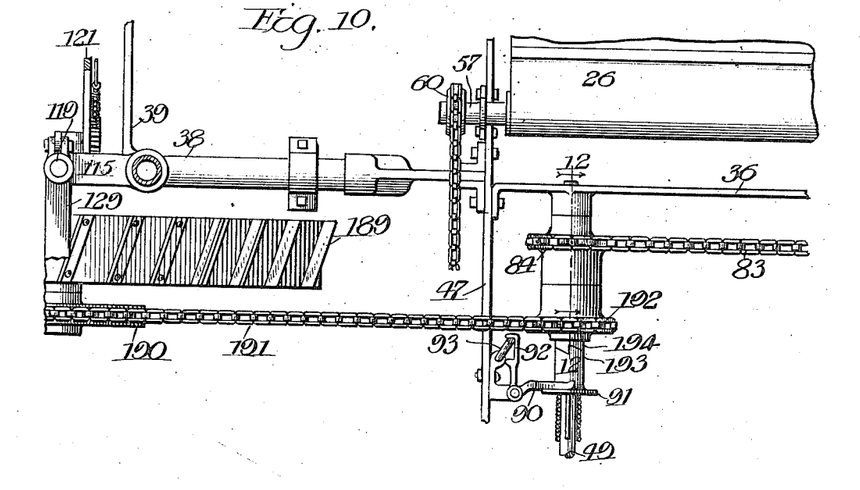
Fig. 10 is a detail plan view showing a modified form of construction of certain parts adjacent the rear carrying wheel.

If desired power for driving the operative parts of the machine may be derived from a carrying wheel located at the rear of the machine. A form of construction adapted to supply power in this way is shown in Fig. 10. In this instance the rear carrying wheel is indicated at 189. For simplicity of illustration this carrying wheel is shown as being secured to the frame by means of the bracket 114, in lieu of the rear carrying wheel 43, but without means for swinging the wheel for steering. A sprocket wheel 190 is rigidly mounted with the rear carrying wheel 189, and a sprocket chain 191 turns over the sprocket wheel 190 and over a second sprocket wheel 192 located upon the drive shaft 49.

In event it should be desired to supply power for driving the operative parts of the machine, both from the front truck, as 42 or 164, and the rear carrying wheel, as 189, the sprocket wheel 84 and the sprocket wheel 192 are both mounted upon a sleeve 194 which incloses the drive shaft 49 and is operatively connected to the shaft by a clutch 193. As shown, the sleeve 194 is supplied with a series of ratchet teeth 195, and each of the sprocket wheels 84 and 192 is supplied with a pawl, as 196, for engagement with one of the said ratchet teeth for turning the sleeve in one direction. This method of mounting the sprocket wheels 84 and 192 permits either to be turned in advance of the other, as upon variations in the relative rate of turning of the wheels of the front truck, as 42 or 164, and the rear carrying wheel 189.

It will be noted that the location of the front truck 42 or 164 beneath the stub tongue 40, intermediate its ends, and the application of a pulling force to the stub tongue at its forward end, causes this part to act as a lever of which the front truck is the fulcrum. By this means the downward force exerted upon the truck is proportioned to the amount of tractive effort applied upon the end of the tongue. It therefore follows that the downward pressure exerted upon the traction wheels is proportioned to the resistance to the forward movement of the machine afforded by the operative parts of the machine. If increased power is required to drive the machine the traction wheels will be pressed against the ground and will serve to transmit increased power without slippage. On the other hand, only a small amount of downward pressure will be exerted upon the traction wheels when the machine is running light and no great amount of power will be required for drawing these wheels along the ground.

I claim as my invention—

1. In a harvesting machine, in combination, front and rear carrying wheels each adapted to swing upon a vertical axis for steering, grain cutting and binding mechanism located between the wheels, power transmitting mechanism operatively connecting one of the said carrying wheels and the said grain cutting and binding mechanism, and means for vertically adjusting the other of said carrying wheels with respect to the grain cutting and binding mechanism.

2. In a harvesting machine, in combination, front and rear carrying wheels each adapted to swing upon a vertical axis for steering, grain cutting and binding mechanism located between the wheels, power transmitting mechanism operatively connecting one of the said carrying wheels and the said grain cutting and binding mechanism, means for vertically adjusting the other of said carrying wheels with respect to the grain cutting and binding mechanism, a crank arm mounted to swing with each of the said carrying wheels and operative connection between the crank arms.

3. In a harvesting machine, in combination, a frame and front and rear carrying wheels for the frame, one of said carrying wheels being adapted to swing about a vertical axis for guiding the frame laterally in either direction, the other of said carrying wheels being adapted to swing about a vertical axis for guiding the frame laterally in one direction only, and means for vertically adjusting the last mentioned carrying wheel with respect to the frame.

4. In a harvesting machine, in combination, a frame, front and rear carrying wheels for the frame, and a sickle bar transverse to the frame and extending at one side of the same, one of the said carrying wheels being adapted to swing about a vertical axis for guiding the frame laterally in either direction, the other of the said carrying wheels being adapted to swing about a vertical axis for guiding the frame laterally only in the direction of the said side of the frame at which the sickle bar extends, and means for vertically adjusting the last mentioned carrying wheel with respect to the frame.

5. In a harvesting machine, in combination, a frame and front and rear carrying wheels for the frame, the front carrying wheel being adapted to swing upon a vertical axis for guiding the frame laterally in either direction, the rear carrying wheel being adapted to swing upon a vertical axis for guiding the frame laterally in one direction only, and means for vertically adjusting the rear carrying wheel with respect to the frame.

6. In a harvesting machine, in combination, a frame, front and rear carrying wheels for the frame, and a sickle bar transverse to the frame and extending at one side of the same, the said front carrying wheel being adapted to swing upon a vertical axis for guiding the frame laterally in either direction, the said rear carrying wheel being adapted to swing upon a vertical axis for guiding the frame laterally only in the direction of the said side of the frame at which the sickle bar extends, and means for vertically adjusting the rear carrying wheel with respect to the frame.

7. In a harvesting machine, in combination, a frame, front and rear carrying wheels for the frame, each of said wheels being mounted to swing upon a vertical axis for steering, means for swinging the front carrying wheel upon its said vertical axis, a crank arm mounted to swing with each of the said carrying wheels, an intermediate crank arm, a link connecting the free end of the intermediate crank arm with the said crank arm which is mounted to swing with the front carrying wheel and a second link connecting the said intermediate crank arm with the said crank arm which is mounted to swing with the rear carrying wheel, said last mentioned link having a sliding connection with the said intermediate crank arm.

8. In a harvesting machine, in combination, a frame, front and rear carrying wheels for the frame, each of said carrying wheels being mounted to swing upon a vertical axis for steering, a crank arm mounted to swing with each of the said carrying wheels, an intermediate crank arm, means for swinging one of the carrying wheels upon its said vertical axis, a link connecting the crank arm which is mounted to swing with the last mentioned carrying wheel and the intermediate crank arm, and a second link connecting the intermediate crank arm with the said crank arm which is mounted to swing with the other one of said carrying wheels, said last mentioned link having a sliding connection with the intermediate crank arm.

9. In a harvesting machine, in combination, a traveling frame, a caster wheel therefor, a crank arm mounted to swing with the caster wheel, a second crank arm, means for swinging the last mentioned crank arm, and a link connecting the two crank arms, said link having a sliding connection with the said second crank arm.

10. In combination, a harvester frame, a carrying wheel pivotally connected to the said frame to swing about a vertical axis between positions in which the plane of the wheel is parallel with the length and width of the frame respectively, and a wheeled draft truck constructed for detachable connection with either a side or an end of the said frame to support the frame in conjunction with the first mentioned wheel in either of said positions.

11. In combination, a harvester frame, a carrying wheel pivotally connected to the said frame to swing about a vertical axis between positions in which the plane of the wheel is parallel with the length and width of the frame respectively, means for holding the said wheel against swinging in the second mentioned of said positions, a wheeled draft truck constructed for detachable connection with either a side or an end of the frame, a wheel of said truck being adapted to swing about a vertical axis for steering, and means operated by the swinging of the said truck wheel when the truck is connected with an end of the frame for controlling the said swinging of the said carrying wheel when the carrying wheel occupies the first mentioned of its said positions.

12. In combination, a harvester frame, front and rear carrying wheels for the frame, each of said wheels being mounted to swing upon a vertical axis for steering, means for vertically adjusting the rear carrying wheels with respect to the frame, means for swinging the front carrying wheel and means operated by the swinging of the front carrying wheel for controlling the swinging of the rear carrying wheel in any position of vertical adjustment of the said rear carrying wheel, said controlling means acting to prevent the swinging of the rear carrying wheel when the front carrying wheel occupies a position in which the plane of said wheel is parallel with the length of the said harvester frame and when the front carrying wheel has been turned in one direction from said position and to permit the swinging of the rear carrying wheel when the front carrying wheel has been turned in the other direction from said position.

13. In combination, a traveling harvester frame, supported to tilt upon a transverse axis, grain cutting and binding mechanism mounted in the frame, a stub tongue pivotally attached to the front end of the frame to swing in a vertical plane and extending forwardly from the frame, a wheeled truck supporting the stub tongue intermediate its ends, power transmitting mechanism operatively connecting a wheel of the said truck with the said grain cutting and binding mechanism, a nut pivotally mounted in the harvester frame over the stub tongue, a threaded rod extending through the said nut and bearing on the stub tongue, and a draft appliance secured to the forward end of the stub tongue.

14. In combination, a traveling harvester frame supported to tilt upon a transverse axis, grain cutting and binding mechanism mounted in the frame, a stub tongue pivotally attached to the front end of the frame to swing in a vertical plane and extending forwardly from the frame, a wheeled truck supporting the stub tongue intermediate its ends, power transmitting mechanism operatively connecting a wheel of the said truck with the said grain cutting and binding mechanism, a longitudinally extensible strut extending in a vertical plane between the stub tongue and the harvester frame and a draft appliance secured to the forward end of the stub tongue.

15. In combination, a traveling harvester frame, grain cutting and binding mechanism mounted in the frame, an inclined stub tongue secured to the end of the frame and extending forwardly therefrom, the front end of the stub tongue being the higher, a wheel supporting the stub tongue intermediate its ends, power transmitting mechanism operatively connecting the said wheel with the said grain cutting and binding mechanism, and a draft appliance secured to the forward end of the stub tongue.

16. In combination, a traveling harvester frame, grain cutting and binding mechanism mounted in the frame, an inclined stub tongue secured to the front end of the frame and extending forwardly therefrom, the front end of the stub tongue being the higher, a steering wheel supporting the stub tongue intermediate its ends, power transmitting mechanism operatively connecting the said wheel with the said grain cutting and binding mechanism and a draft appliance secured to the forward end of the stub tongue.

17. In a harvesting machine, in combination, a traveling frame, grain cutting and binding mechanism mounted in the frame, a pole secured to the frame and extending forwardly therefrom, a truck supporting the pole in front of the frame, power transmitting mechanism operatively connecting a wheel of the said truck and the said grain cutting and binding mechanism, and a draft appliance attached to the pole independently of the said truck.

18. In a harvesting machine, in combination, a traveling frame, grain cutting and binding mechanism mounted in the frame, a pole secured to the frame and extending forwardly therefrom, a steering truck supporting the pole in front of the frame, power transmitting mechanism operatively connecting a wheel of the said truck and the said grain cutting and binding mechanism, and a draft appliance attached to the pole independently of the said truck.

19. In a harvesting machine, in combination, grain cutting and binding mechanism mounted in the frame, a pole pivotally secured to the frame for angular adjustment in a vertical plane and extending forwardly from the frame, a truck supporting the pole in front of the frame, power transmitting mechanism operatively connecting a wheel of the said truck and the said grain cutting and binding mechanism, and a draft appliance attached to the pole independently of the said truck.

20. In a harvesting machine, in combination, grain cutting and binding mechanism mounted in the frame, a pole pivotally secured to the frame for angular adjustment in a vertical plane and extending forwardly from the frame, a steering truck supporting the pole in front of the frame, power transmitting mechanism operatively connecting a wheel of the said truck and the said grain cutting and binding mechanism, and a draft appliance attached to the pole independently of the said truck.

WALTER L. HENDRICKS.

Witnesses:
G. KELLER LEET,
CHARLES B. GILLSON.